United States Patent [19]

Schlachter

[11] Patent Number: 4,863,502
[45] Date of Patent: Sep. 5, 1989

[54] METHOD FOR THE MANUFACTURE OF A COMPOSITE FIBER, WEB, STRAND OR ROVING

[75] Inventor: Fredo Schlachter, Johannesberg, Fed. Rep. of Germany

[73] Assignee: Manville Corporation, Denver, Colo.

[21] Appl. No.: 108,402

[22] Filed: Oct. 14, 1987

[30] Foreign Application Priority Data

Oct. 14, 1986 [DE] Fed. Rep. of Germany ....... 3634904

[51] Int. Cl.⁴ ............................................. C03B 37/12
[52] U.S. Cl. ........................................ 65/4.3; 65/4.4; 65/9
[58] Field of Search ...................... 65/2, 4.1, 4.4, 11.1, 65/10.1, 9, 4.3

[56] References Cited

U.S. PATENT DOCUMENTS

| 1,769,181 | 7/1930 | Jackson | 65/4.1 |
| 2,704,734 | 3/1955 | Draper et al. | 65/4.4 X |
| 3,676,096 | 7/1972 | Schuller et al. | 65/11.1 X |
| 3,955,952 | 5/1976 | Drummond | 65/10.1 X |

Primary Examiner—Robert L. Lindsay
Attorney, Agent, or Firm—John D. Lister

[57] ABSTRACT

A method for forming composite webs. The method includes introducing alternative fibers during the fiber glass drum or sliver manufacturing process so as to produce a composite web, strand or roving.

7 Claims, 1 Drawing Sheet

METHOD FOR THE MANUFACTURE OF A COMPOSITE FIBER, WEB, STRAND OR ROVING

FIELD OF THE INVENTION

The invention relates to the field of manufacture of composite fiber webs or strands from glass fibers and fibers or filaments of other materials.

DESCRIPTION OF RELATED ART

In the textile industry, the manufacturing methods for composite fiber webs or strands are common knowledge (the terms web, roving and strand are used interchangeably herein). Accordingly, fibers of different materials and/or composition are mixed before the process or at the spinning line. In other words, natural fibers are mixed with other natural fibers prior to the manufacture of the fiber web, or initially, synthetic fibers or filaments are produced and then these are mixed with natural fibers or other synthetic fibers prior to web production and then are subsequently worked into a fiber web.

Even in the fiber glass industry, composite fiber webs are produced according to this method, since it lends itself well to the manufacture of composites since the fiber materials can be ideally balanced with each other. An essential element is the fact that glass materials have limited elasticity which is improved by the incorporation of synthetic fibers. In addition, a frequent reason for the manufacture of composite fiber webs of glass fibers and fibers or filaments of other materials, especially synthetic fibers and filaments, are restrictions or prohibitions regarding the use of asbestos fibers which were introduced in many countries for health-political reasons. Glass fibers can be utilized as a replacement for asbestos for reasons not discussed in detail here, whereby for one version, a mixture of glass fibers and synthetic fibers or filaments was shown to be suitable. In the past, such composite fiber products were produced according to the methods described for the textile industry, i.e. glass fibers were produced separately and mixed with the produced synthetic fibers prior to forming into a glass web.

SUMMARY OF THE INVENTION

The intent of the invention was to replace the prior art method, which uses several work processes (fiber manufacture, mixing and forming), by a simpler, more rapidly proceeding method which achieves at least the same homogeneity level of the composite fibers.

The invention consists in having discovered that surprisingly the so-called "drum attenuation or sliver method" for the manufacture of glass fibers is suitable to mix the glass fibers with the fibers of other materials during the manufacture of glass fibers from glass filaments and, immediately following, to produce a composite fiber web in the same manner used for producing a pure glass fiber web. It is now unnecessary to first produce the glass fiber and to mix it with synthetic fibers and then to produce from this mixture a glass fiber/synthetic fiber web. Instead, the tried and proven method for the manufacture of a glass fiber web in one step (i.e., according to German Patent Specification DE-PS No. 825 456) can be used for the production of a composite fiber web, whereby the final product can be precisely adjusted to the required fiber quantity and composition without restricting the glass filament drawing and fiber spinning process.

The use of the known drum attenuation method, in which filaments [4] are drawn from the ends of glass rods or from nozzles of a trough [2] containing fluid glass with the help of a rotating drawing surface [3] is proposed for the manufacture of a composite fiber web of glass fibers and fibers of filaments of other materials, especially synthetic fibers. It avoids the complications of the known method from the textile industry in which glass fibers are first produced and then are mixed with the fibers of other materials either prior to processing or during the drawing process. The filaments [4] are drawn parallel, next to each other, and attenuated to thin filaments, which are then lifted from the circumference of the rotating drawing surface before the completion of one wrap around, dispersed into fibers and fed into an enclosed space [7]. This space is oriented rotation symmetrical and axis parallel to the drawing surface. In the enclosed space, a fiber whirl [9] is formed which is drawn off on one side as a fiber, whereby fibers or filaments of other materials [22] are uniformly added during the operation of the spinning process.

DESCRIPTION OF THE PREFERRED EMBODIMENT

Figure 1:
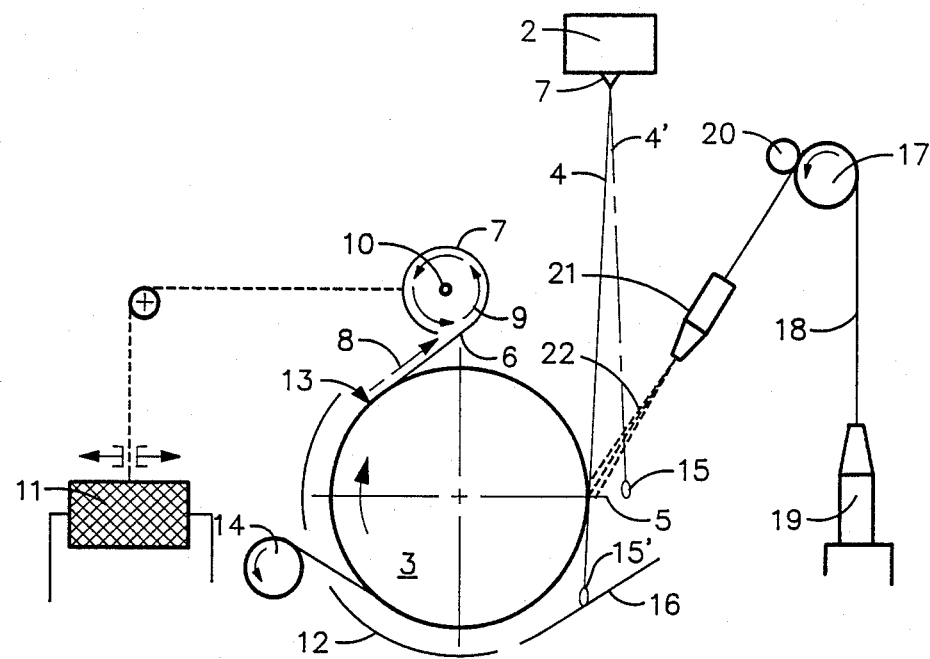
FIG. 1 illustrates the manufacture of a composite fiber web using the drum attenuation method to produce glass fibers from glass filaments.

With the help of a rotating drawing surface [3] in the form of a drum, large numbers of parallel, side by side glass filaments [4] are continuously drawn from the spinning nozzles [1] of a melting trough [2] or from the heat softened ends of glass rods. These contact the drawing surface external to the free fall line at [5], are drawn off and attenuated to a smaller diameter than at their formation with the help of this drawing surface. Prior to the completion of a single wrap around of the drawing surface [5] the filaments [4] are lifted by a suitable lifting device [6], for instance a stripper of thin sheet metal, or by counter directed blast streams, and fed into an enclosed space [7] such as a so-called spinning funnel, which is oriented parallel to the rotating drawing surface [3]. A co-rotating air cushion is formed around the drawing surface [3] by the high rotation velocity. It assists during the drawing of the filaments [4] and is also lifted by the removal device [6] and fed into the enclosure [7] along with the suspended fibers (8). As a result, an air-fiber-vortex [9] is created which forms the fibers in the circulating whirl to a fiber web or a roving. It is then continuously drawn off through a tubular nozzle [10] by means of a drawing and spooling device [11]. The strength of the web is determined by the number of fibers and/or the removal rate. The side of the enclosure [7] opposite the nozzle [10] is open and allows the rotational wind or the air cushion in the funnel to escape.

The rotating drawing surfce [3] is surrounded over a large portion of its circumference at a distance by a mantle [12] which serves as a protective device. In addition, it assures that no contaminants are pulled to the drawing surface by the resultant rotational wind and that the air cushion surrounding the drum is safely guided to the removal location [13].

If defects occur at the removal location [13], then a preceeding removal device [14] is activated which removes the accumulating filaments from the drawing surface [3] until the defects at [13] have been corrected.

At the beginning of the process described above, and also when the filaments break during the production process, a glass droplet [15] is formed at the spinning location [1]. It pulls a new filament [4'] behind itself during the free fall. The filament is conducted to the drawing surface [3] by an oblique guide surface [16] underneath the drum. The filament is caught by the drawing surface and is carried along by it. At the same time it is separated from the droplet [5].

By means of pull wheels [17] or by a pull drum extending over the entire width of the drawing surface [3], filaments [18] or a synthetic fiber supply in the form of a filament yarn or a roving are drawn from a supply location, such as an unspooling device [19]. The filaments [18] or the yarn/roving are dispersed or opened up to separate fibers by a traversing friction wheel [20] in contact with the pull wheels [17] or the pull drum. The fibers then arrive at a drawing and attentuation device [21], such as a nozzle, which effects a further disintegration to individual fibers and conveys them in the direction of the desired impact and delivery area of the drawing surface [3].

The synthetic fibers are conveyed to the contact point [5] or the contact region of the filaments [4] extending across the drawing surface [3]. Accordingly, the synthetic fibers [22] arrive at the contact line of the filaments [4] on the drawing surface [3] between the filaments lying next to each other as well as on them. The synthetic fibers are then conveyed from this surface, together with the filaments [4], by the rotational air draft and/or by the air cushion created by the mantle [12] to their removal point [13]. Together with the glass fibers created at this point, they are then conducted as a glass fiber/synthetic fiber whirl into the enclosed space [7] in which they form a composite fiber web.

The above description makes a clear distinction between the filaments [4] drawn from the spinning position [1], which are deposited onto and carried along and attenuated by the drawing surface [3] and the fibers [8] created by the whirl in the enclosure [7]. In fact, this distinction applies only to a more or less large fraction of the fibers. The filaments [4] are in actuality not only drawn off and attenuated by the drawing surface [3] but are also drawn off and attenuated by the air cushion created by this surface, whereas both can be effective for the individual filament during its path. A filament can therefore arrive at the drawing surface, then become immersed in the air cushion, be deposited again at the drawing surface, etc. or the other way around. The filaments are frequently broken into longer and shorter pieces by this, so that at [3], longer and shorter filament pieces or fibers are present, which additionally contributes to a thorough mixing of the glass fibers and the synthetic fibers even before entry into the enclosed space [7].

By choice of the drawing velocity at [17] and the air velocity of the jet [21] different effects can be accomplished. If for instance, the supply of the synthetic fibers [22] is at a higher rate than that of the produced glass filaments [4], a slight bulging occurs in the produced web.

The choice of synthetic fibers is not restricted to one material condition and can be selected to suit the requirements as well as the quantity. Even fine metal fibers or, if necessary, natural fibers and filaments can be processed according to the method of the invention.

Directing the synthetic fibers [22] to the contact location [5] of the glass fibers [4] on the drawing surface [3] has the advantage of bringing them together early with the filaments and the glass fiber pieces and glass fibers produced partially on the drawing surface. However, the synthetic fibers can also be introduced at the removal position [13] for the glass fibers or at the location between this and the entry into the enclosed space [7]. This has the advantage that the synthetic filaments are assured not to come in contact and be mixed with glass filaments [4] but only with glass fibers 8.

What is claimed is:

1. In a method for the manufacture of glass fibers including the steps of: drawing glass filaments (4) parallel to each other; attenuating the filaments into thin glass fibers by introducing the filaments to a drawing surface comprising the surface (3) of a rotating drum; removing the glass fibers from the circumference of the rotating drum drawing surface before completing the first rotation; separating said glass fibers from the rotating drawing surface; feeding said separate glass fibers into a rotation symmetrical enclosed space which is parallel to the axis of the rotating drawing surface; and forming said glass fibers into a whirl (9) which is drawn off to one side of the enclosure as a fiber web; the improvement comprising the steps of:

separating filaments of yarn of other fibrous material into separate fibers; and uniformly introducing the separated fibers of other material to the glass fibers prior to said step of forming.

2. Method according to claim 1 wherein said step of introducing includes uniformly dispersing said other fibers over substantially the entire width of said rotating drawing surface at or in the vicinity of the contact area (5).

3. Method according to claim 1 wherein said step of introducing said other fibers or filaments includes uniformly dispersing said other fibers or filaments onto said drum at a location on said drum between said contact area (5) and said removal location (13).

4. Method according to claim 1 wherein said fibers or filaments of other materials are uniformly dispersed into said glass fibers during or after said step of removing.

5. Method according to claim 1 wherein said fibers or filaments of other materials are uniformly dispersed into said glass fibers during said step of feeding.

6. A method according to claim 1, wherein the separated fibers of other fibrous material are introduced to the glass fibers by spraying the separated fibers through a nozzle.

7. A method according to claim 6, wherein the fibers of other fibrous material are separated from strands of such other fibrous material by friction means engaging the strands just prior to feeding the fibers so formed into the nozzle.

* * * * *